Figure 4:
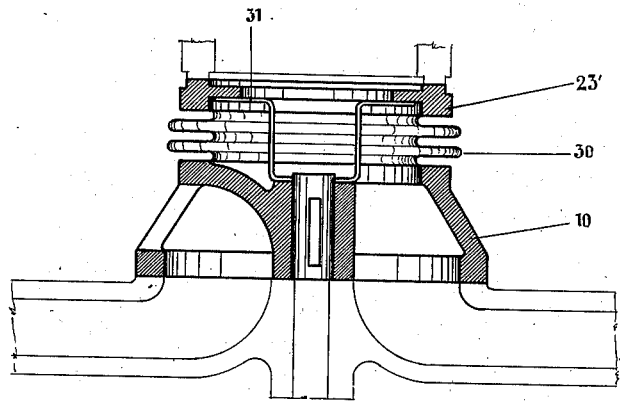

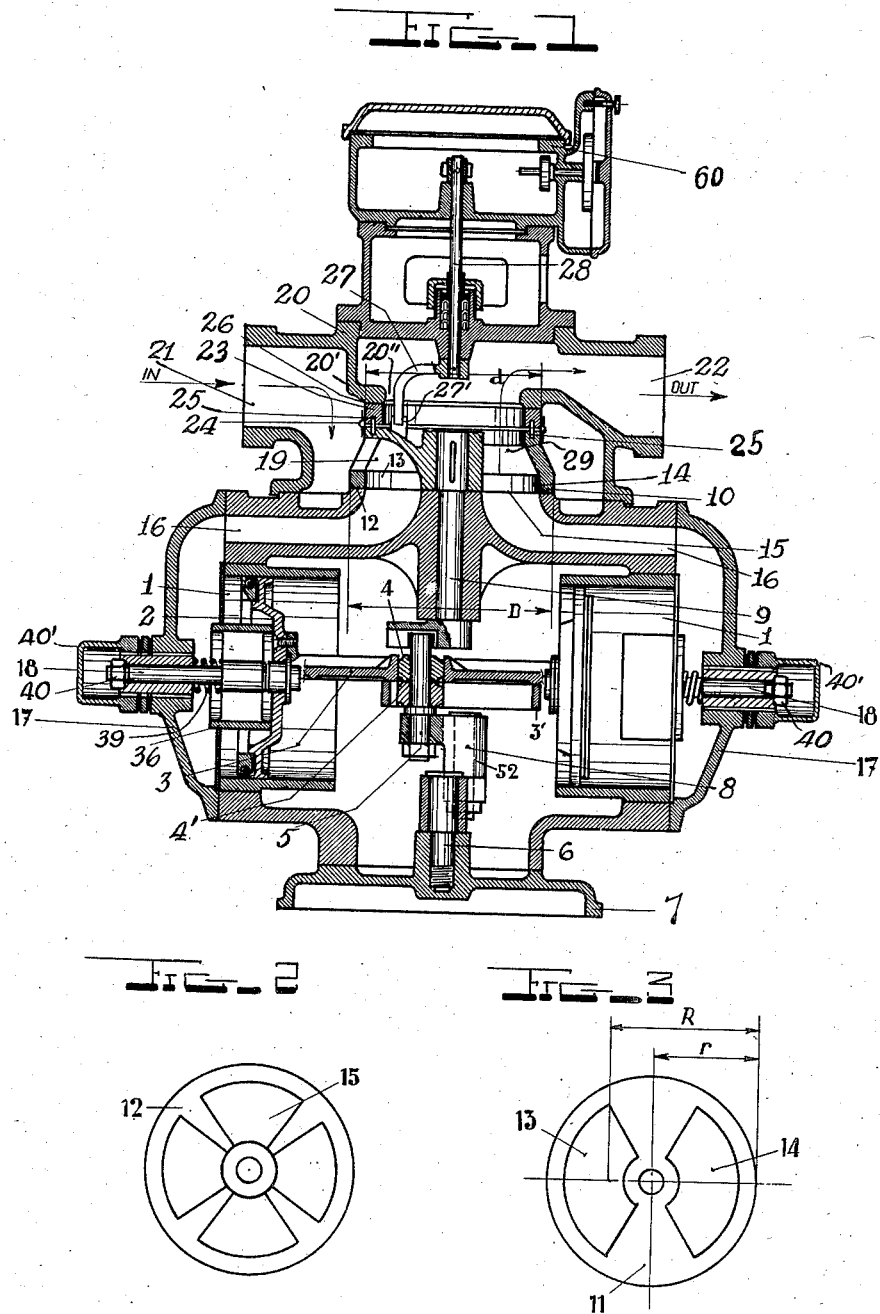

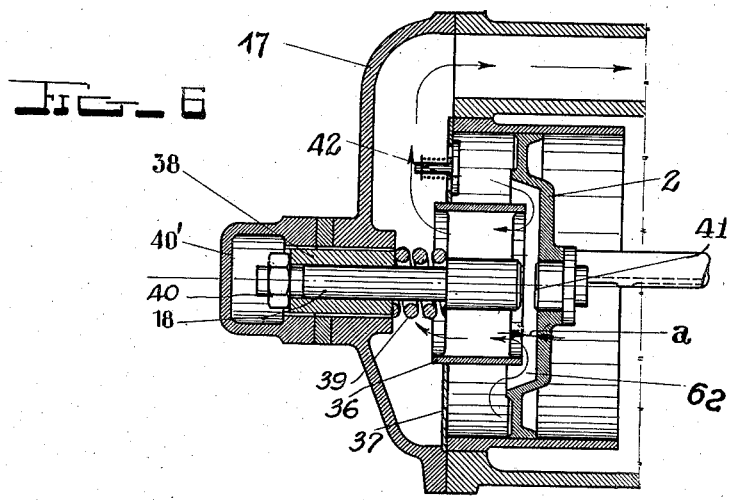
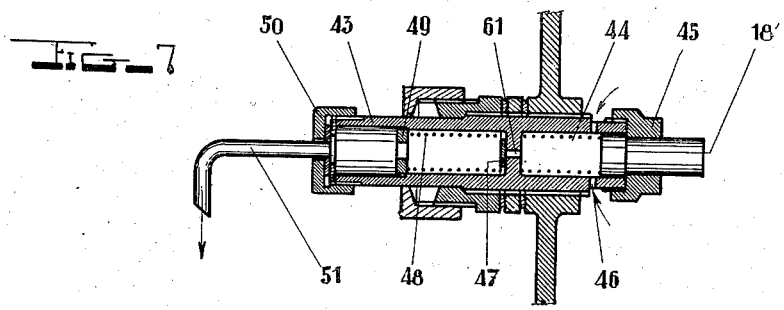
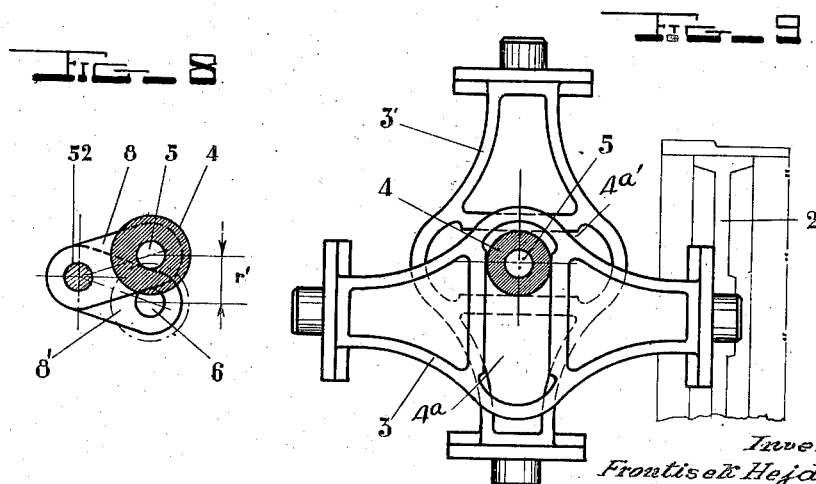

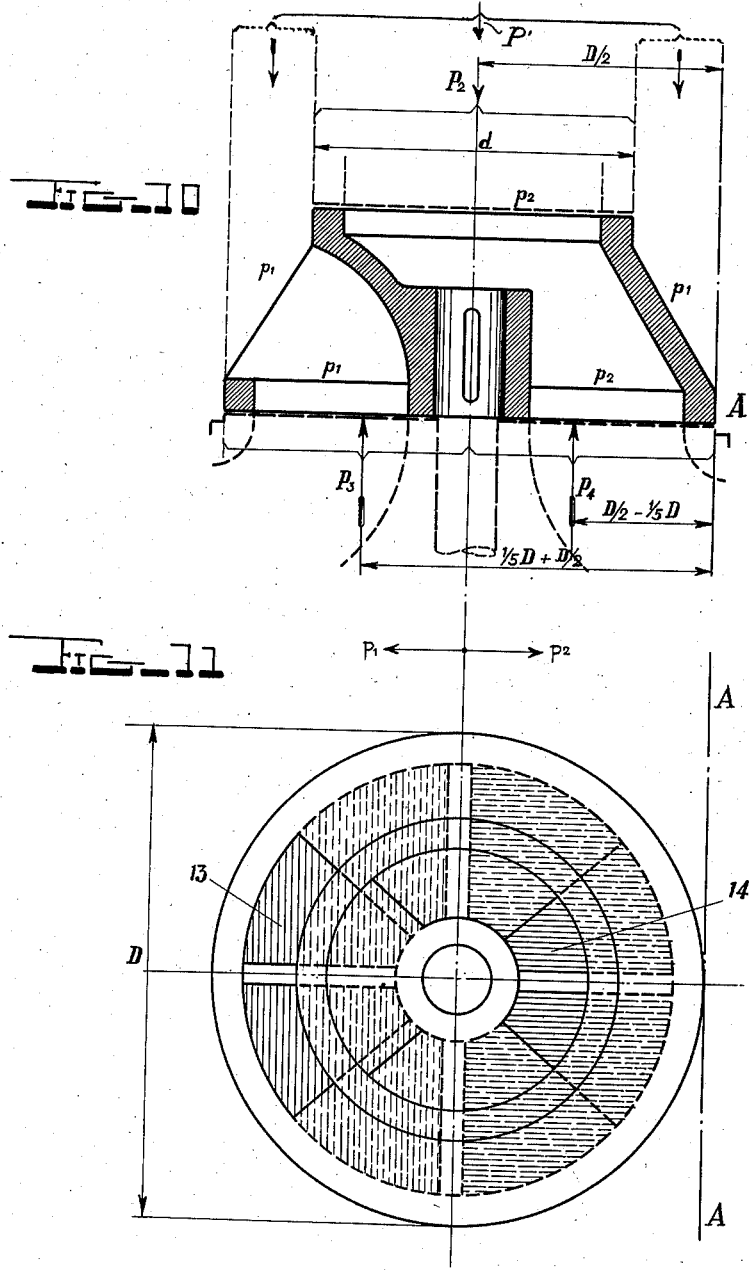

Patented May 3, 1938

2,116,265

UNITED STATES PATENT OFFICE 2,116,265

MULTIPISTON METER

František Hejduk and Jan Neumann, Prague, Czechoslovakia

Application December 26, 1934, Serial No. 759,293
In Czechoslovakia December 27, 1933

8 Claims. (Cl. 73—247)

The subject of the invention is a volumetrically working multi-piston meter suitable for accurately measuring liquids having a small viscosity.

The object of the invention is to provide a meter for obtaining the highest accuracy of measurement at various flow speeds and permanent maintenance of this accuracy.

Inaccuracy of measurement which occurs at different speeds of flow of liquid is due chiefly to lack of tightness of the distributor and measuring devices. The leakage due to lack of tightness depends, under otherwise equal conditions, on the one hand on the loss of pressure in the meter which increases with the increase of the passive resistance, and on the other hand on the size of the contact surfaces of the distributor device. Accuracy of measurement is moreover dependent on the perfectly shock-free cooperation of all the devices, that is, upon the elimination of mechanical and hydraulic shocks in the measuring apparatus.

Inaccuracy of measurement which occurs after a considerable period of use, is due to the wear of the metering members or to such a wear of the distributor device as will result in a deterioration of the tight joint between its parts. As regards wear, there is the tendency to dimension the metering members so that they practically show no wear at all, and in dimensioning the distributor devices so that their frictional resistance and speeds of movement are as low as possible whereby favourable conditions for little wear are produced.

According to the new invention, the named object is attained by a particular construction of some meter parts, the action of which is due to their mutual inter-dependence. The whole meter is thereby improved to a considerable degree.

In the first instance, there is the distributor valve which should have a small diameter and should be relieved from load as far as possible, in order to have a small resistance only. In connection therewith, short closing edges, small pressure per square unit of surface, small peripheral velocity and small and uniform wear will result. The valve has, moreover, the advantage that it enables the crank chamber to be completely separated from the flowing liquid and permits the use of almost rectilinear and very short inlet and outlet passages for the liquid. This construction is moreover antageous as regards the discharge of air accidentally entering from the metering space.

As previously mentioned, the metering parts must not be subjected to wear, more particularly wear which might cause an alteration of the piston stroke. In cases in which the stroke is directly limited by the crank mechanism, this condition is not fulfilled, inasmuch as the parts of the crank mechanism are always subjected to wear. But even with constructions in which the piston hub is limited by fixed abutments, there occurs a certain, although substantially lesser, wear owing to the knocks upon the contact surfaces occurring particularly with large apparatuses. The damping of the piston movement which is already produced in the end positions by the distributor valve, is not sufficient, and the invention provides for the damping of shocks by mechanical and hydraulic means to the highest degree. The crank mechanism of the meter having stroke limitation of the pistons by abutments serves only for actuating the distributor and the counting device and for the mutual movement connection of the two piston units in the usual four-piston type of meter, but it must be possible to vary the piston stroke for obtaining accurate measurement.

For this reason a small play is left between the crank and the corresponding cross guideways or slots in the yokes connecting opposed pistons. However, shocks of a secondary order are caused by this play, which may, in a lesser degree, influence the accuracy and the permanence of the measurement. For this reason the invention also provides for a construction of a meter crank which will avoid such shocks.

One constructional example of the invention is shown in the accompanying drawings.

Figure 5:
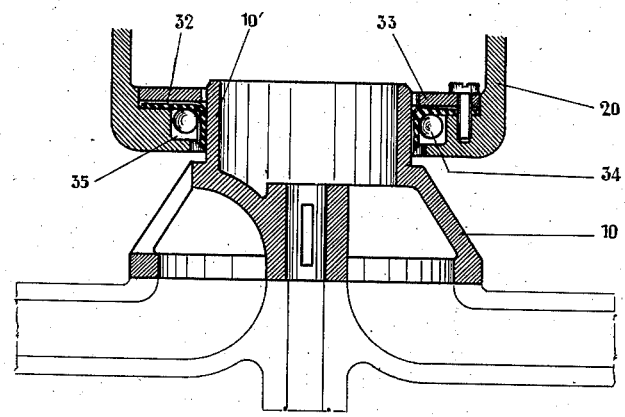

Fig. 1 is a vertical section through the complete four-piston meter, taken through the axis of two cylinders, Figs. 2 and 3 are views of the seat and the valve, Figs. 4 and 5 show cross-sectional views of other constructions of distributor valves, Fig. 6 is a cross-sectional view of the damping device in the cylinder cover, Fig. 7 is a cross-sectional view of a device employing the damping abutment for taking samples of the measured liquid, Figs. 8 and 9 show a construction of the crank shaft.

Fig. 10 is a cross-sectional view of the valve showing the forces and moments caused by the pressure of the liquid acting on the surfaces of the valve. Fig. 11 is a plan view of the valve showing the different areas acted on by the pressure of the liquid.

The casing of the meter according to Fig. 1 contains four working cylinders 1 arranged in pairs, each pair always having common axes, both axes being at right angles to each other and intersecting in the vertical main axis of the meter. In each cylinder, is provided a piston 2, two such pistons, having the same axis, being connected by yokes 3 and 3' having cross guideways. In these cross guideways of the yokes 3, 3', Fig. 9, move rollers 4, 4' mounted upon a pin 5, said pin being fixed in a double crank 8, which latter turns as a whole about a pivot 6 inserted into the lower cover 7. The pivot 6 rotates during its movement the crank shaft 9.

Above each cylinder is arranged a passage 16 through which liquid enters and leaves the meter cylinders and the cylinder ends are closed by means of the covers 17 into which are arranged adjustable abutment members 18. All the four passages 16 terminate in a flat seat 12 in four openings 15, Figs. 1 and 2, concentrically and as close as possible to the crank shaft 9 so that the diameter of the valve seat 12 becomes as small as possible. Upon the seat 12 rotates the distributor valve 10 which is keyed upon the mentioned shaft 9. The valve has generally the shape of a truncated cone and in its lower bearing surface 11, Fig. 3, there are two ports 13 and 14. The port 13 serves for the inlet of the liquid and the port 14 for the outlet of the liquid from the metering cylinders. The inlet port 13 is connected by the duct 19 which is entirely separated from the remaining valve space, with the port in the conical wall of the slide. The outlet port 14 is directly connected with the concentric circular port at the upper end of the valve 10. The space around the slide is closed by the cover 20, which latter is provided with the inlet socket 21 and the outlet socket 22 separated one from the other by a partition wall 20' having a circular aperture 20". The partition wall 20' is arranged to provide a chamber, around the outer surface of the valve 10, connected to the duct 19 of the inlet port 13. In order to obtain tightness during the passage of the metered liquid from the rotating valve 10 into the stationary outlet socket 22, a ring 23 is provided at the upper end of the valve, which is held by an elastic and tight diaphragm 24 in the proper bearing position, the two parts 10, 23 being connected together by a few pins 25 of tombac, for example, which permit of an axial displacement. The pins 25 permit axial displacement of the valve parts 10 and 23 while at the same time they prevent torsional movement and angular displacement between these parts. The ring 23 moves upon an annular face 26 surrounding aperture 20" of the cover 20 and may be further pressed against the latter by a suitable, not illustrated spring being analogous to the spring 31 in Fig. 4. The metering movement is transmitted to the corresponding, only partly illustrated, counting device 60, by means of a carrier member 27 and a shaft 28, said member 27 engaging a lug 27' on the valve 10.

The described apparatus works as follows:—

The liquid enters through the inlet socket 21, the duct 19 of the valve and from the latter through the port 13 in the valve seat and then through the corresponding passage 16 into the corresponding working cylinder 1. The simultaneous outflow of liquid from the opposite working cylinder takes place through the corresponding passage 16 and the port 15 in the seat 12 and then through port 14 into the space 29 of the valve 10, where the liquid flows through the centre of the valve and through the ring 23 in the upper cover portion 20, and from there through the outlet socket 22. The pressure of the liquid acting on the piston 2 causes this piston to move in the inward direction. This movement is accompanied by the rotation of the distributor valve 10 since this valve is connected by means of a crank mechanism to the piston 2. During this rotation this valve closes the flow of liquid to the first cylinder, that is the cylinder associated with the piston 2, and simultaneously the inlet to the next cylinder is opened whereby the piston in this latter cylinder is pushed inwardly through the action of the liquid. By turning the valve through 90 degrees the entrance to the first cylinder is completely closed, while at the same time the port 13 of the valve is brought into the registration with the port 15 of the second cylinder. By turning the valve through 90 degrees the inlet to the second cylinder is fully opened and by turning the valve through 180 degrees the liquid pressure is caused to act upon the piston opposite to the first piston.

Although the essence of the invention has been explained in connection with a four-piston meter with horizontal cylinders, it is possible to apply the invention to meters with a different number of cylinders and a different arrangement of cylinders, without altering thereby the essence of the invention.

In Fig. 4 is shown a modified construction of the distributor valve which is so designed that the ring 23' is connected with the valve 10 by means of a thin-walled corrugated tube 30 of tombac, for example, soldered on at both ends. The valve then constitutes a single metallic member, the elastic connection between its contact surfaces being maintained. The flat spring 31 insures both slide faces bearing against their corresponding seats. The corrugated tube 30 which is attached to the ring 23' and the valve part 10 permits the ring 23' and the valve part 10 to move axially with respect to each other and at the same time prevents torsional movement between the ring and the valve part 10. The spring 31 presses the ring 23' away from the valve part 10 and maintains this ring and the valve part 10 against their respective seats.

Fig. 5 shows a further construction of the valve in which the latter consists of one piece, the upper end 10' being tubular and guided in a gland, which latter insures tightness along the cylindrical surface.

In Fig. 5 an example of such a gland affording small resistance during the rotation is given. Tightness is attained by means of a thin leather cup 32 which is fixed to cover 20 by means of a ring 33 secured to cover 20 and is pressed by a helical spring 34 arranged in a recess 35 of the cover 20, against the side of the valve 10, 10' along which tightness is to be maintained.

In order that the valve should answer in the most perfect manner the previously mentioned requirements, that is, should offer a minimum resistance, it is necessary that the valve should with the smallest possible diameter be as far as possible relieved from load. In connection with relieving the valve from load, attention must be paid to the upwardly acting influence of the surface of the inlet port 13, Fig. 1. The loss of pressure in the meter required for actuating the meter causes the valve 10 to be subjected to several forces. In order that the valve should not rise from its seat, owing to the existence of the port 13, the moment resulting from the moment originating from the circular surface of diameter D—d multiplied by the pressure p1 and the arm $$\frac{D}{2}$$

and the moment of the surface of the diameter d multiplied by p2 and the arm $$\frac{D}{2}$$

must be greater than half of the surface of diameter D multiplied by the pressure p1 and the arm $\frac{7}{10}$D and half of the surface of diameter D multiplied by the pressure p2 and the arm $\frac{3}{10}$D. For purposes of explanation, the values of the arms $\frac{7}{10}$D and $\frac{3}{10}$D were obtained by assuming $3\pi$ equal to 10.

This may be more clearly brought out as follows in conjunction with Figs. 10 and 11 in which the relative dimensions of the valve 10 are shown:

D=the largest valve diameter on the lower seating surface.

d=the outer diameter of the upper annular base surface.

The minimum diameter of d is governed by the condition that the cross-sectional area of an opening of diameter d is equal to the cross-sectional area of one of the openings 13 or 14 so that it possesses a sufficient flow cross-section. The greatest value of the diameter d would be when this diameter is equal to the diameter D, that is, when the valve shape is that of a cylinder. When a greater pressure prevails on the exterior of the valve than on the interior, then it is obvious that in the case where d is a minimum, the valve will be forced upon its lower seat with a relatively large force. On the other hand, when d is equal to D the tendency of the forces acting on the valve is to lift it on the side of the inlet opening. The optimum value for the diameter d may be determined by the following procedure. In order that the calculation shall not become too complicated owing to the influence of entirely subordinate factors, the following assumptions are made. It is assumed that the pressure p1 acting on the exterior of the valve, as shown in Figure 10 is greater than p2 acting within the valve, by a pressure represented by $\Delta p2$, which represents the pressure loss in the meter. The transition of the pressure from p1 to p2 is assumed to occur at the outer side of the valve and is based on the radius $$\frac{d}{2}$$

or $$\frac{D}{2}$$

Finally it is assumed that the pressure p1 acts against half of the lower surface of the valve and the pressure p2 acts on the other half. This assumption is possible when the valve moves against four openings which in general form a circular surface and of which two are connected with the inlet opening 13 receiving the pressure p1 and the other two are connected with the outlet opening 14 receiving the pressure p2. The weight of the valve may be ignored, likewise the force engendered by the weight of the elastic connection to the upper part of the valve body may be ignored since these forces are very small in proportion to the hydraulic forces. For example, in a valve having a diameter D equal to seven centimeters and a weight of $\frac{1}{10}$ kilogram, the excess pressure p1—p2 may amount to $\frac{1}{10}$ of a kilogram per square centimeter.

The equilibrium of the forces and moments around the axis A at a distance of $$\frac{D}{2}$$

from the valve axis is given by the following calculations in which $P_1$ is equal to $$\pi\frac{(D^2-d^2)}{4}p_1$$

$$P_2=\frac{\pi d^2}{4}p_2$$

$$P_3=\frac{\pi D^2}{4}\frac{1}{2}p_1$$

and $$P_4=\frac{\pi D^2}{4}\frac{1}{2}p_2$$

Forces $$P_1+P_2=P_3+P_4$$

$$\pi\left(\frac{D^2-d^2}{4}\right)p_1+\frac{\pi d^2}{4}p_2=\frac{\pi D^2}{4}\frac{1}{2}p_1+\frac{\pi D^2}{4}\frac{1}{2}p_2$$

$$-d^2p_1+D^2p_1+d^2p_2=\frac{D^2}{2}p_1+\frac{D^2}{2}p_2$$

$$d^2(p_2-p_1)=-\frac{D^2}{2}p_1+\frac{D^2}{2}p_2$$

$$d^2(p_1-p_2)=\frac{D^2}{2}(p_1-p_2)$$

$$d^2=\frac{D^2}{2}$$

Moments $$\left(\frac{\pi}{4}[D^2-d^2]p_1+\frac{\pi}{4}d^2p_2\right)\frac{D}{2}=$$

$$\left(\frac{\pi D^2}{4}\frac{1}{2}p_1\right)\left(\frac{D}{2}+\frac{4}{3\pi}\frac{D}{2}\right)+\left(\frac{\pi D^2}{4}\frac{1}{2}p_2\right)\left(\frac{D}{2}-\frac{4}{3\pi}\frac{D}{2}\right)$$

$$(-D^2+d^2)p_1\frac{D}{2}-d^2p_2\frac{D}{2}=$$

$$-\frac{D^2}{2}p_1\left(\frac{D}{2}+\frac{4}{3\pi}\frac{D}{2}\right)-\frac{D^2}{2}p_2\left(\frac{D}{2}-\frac{4}{3\pi}\frac{D}{2}\right)$$

$$d^2(p_1-p_2)=D^2p_1\left(1-\frac{1}{2}-\frac{4}{2(3\pi)}\right)-D^2p_2\left(\frac{1}{2}-\frac{4}{2(3\pi)}\right)$$

$$d^2=\frac{\left(\frac{1}{2}-\frac{2}{3\pi}\right)(D^2p_1-D^2p_2)}{p_1-p_2}=D^2\frac{(p_1-p_2)\left(\frac{1}{2}-\frac{2}{3\pi}\right)}{p_1-p_2}$$

$$d^2=\frac{3}{10}D^2$$

$$d=D\sqrt{\frac{3}{10}}$$

In order that the valve shall not become lifted under the influence of opening 13 and the effect of the excess pressure in the valve chamber at the side of opening 13 (which excess pressure is exerted approximately beneath half of the lower valve resting surface) the resulting moment of force which acts on the valve must press the same against its seat. This requirement is achieved by selecting a proportionately smaller diameter d with respect to D and this then governs the shape of the distributing valve. The most undesirable case occurs when the inlet opening of the valve becomes located symmetrically beneath the rib between two channels in the seat beneath the valve. In this case the inlet pressure of the liquid p1 acts from beneath upon the valve to the extent of half its surface and the second side is acted upon by the outlet pressure p2.

In order that the valve shall not lift, the sum of the moments originating from the circular surface of diameter D—d multiplied by the pressure $p_1$ and the arm $$\frac{D}{2}$$

and those of the surface of diameter $d$ multiplied by $p_2$ and the arm $$\frac{D}{2}$$

must be greater than half the surface of diameter D multiplied by the pressure $p_1$ and the arm $$\frac{D}{2}+\frac{2}{5}\frac{D}{2}$$

and half the surface of diameter D multiplied by the pressure $p_2$ and the arm $$\frac{D}{2}-\frac{2}{5}\frac{D}{2}$$

This equation gives the diameter as $$d \leqq \sqrt{\frac{3}{10}D^2}$$

The force of the spring also has an influence on the diameter $d$, said spring forcing the valve to its lower seat. In the case of greatest spring force (as shown by experience and observation) the diameter $d$ may be increased up to about 25% so that the given equation takes the following form:

$$d \leqq 1.25\sqrt{\frac{3}{10}D^2}$$

It is known from the Varignon law that the moment of a resultant force is the sum of the moments of all the lateral forces and that it is possible to add to a moment unless we should destroy the equilibrium of two other moments which are equivalent but of opposite direction.

It would be very difficult to find for the force $P_1$ the center of area of the surface $$\frac{\pi D^2}{4}-\frac{\pi d^2}{4}$$

when the part of the port 13, shown sectioned in Fig. 11, is subtracted. The same difficulty occurs during the computation of the center of area, for the force $P_3$, of the semi-circle $$\frac{\pi D^2}{8}$$

when the same part of horizontal projection of the port 13 is deducted.

As the moments of these surfaces, on which is acting the same liquid pressure, are of the same value but of opposite direction, the mathematical computation is facilitated by adding to the actual moment of force $P_1$ the moment of the horizontal projection of the port 13, acting downwards. The actual moment of the force $P_3$ and the same moment is taken as acting upwards. By this way the computations are facilitated without making any fault or inaccuracy.

The same consideration takes place during the computations of the moments from the forces $P_2$ and $P_4$ and a moment of the surface 14 of Fig. 11, equal to the horizontal projection of the port 14 is added. Thus the calculation could thereafter be executed as if the ports 13 and 14 were not present.

The valve 10 according to the present invention permits of the outflow of liquid occurring through its upper surface in the upward direction and not in the downward direction through the crank chamber as was hitherto mostly the case. By the separation of the crank space from the flowing liquid further advantages are attained. No impurities carried by the metered liquid can reach the enclosed crank mechanisms. Moreover, no passage of the liquid due to leakage around the piston can take place between the metering space of the cylinders, into which the already metered liquid flows, as is the case with meters in which the metered liquid flows out through the crank chamber. The closed crank chamber can moreover be filled with a liquid which lubricates the crank mechanism and preserves the packing cups of the pistons.

Fig. 6 shows on a larger scale the damping device of Fig. 1 for damping the movement of the piston before its extreme dead centre. The damping is here a double one, namely, by means of a spring and hydraulic. The abutment 18 is here constructed as a bolt which is provided at one end with a tube 36 connected therewith by means of ribs. The tube passes tightly through a plate 37 which is secured between the cylinder and the head 17 and separates completely the cylinder space from the inlet and outlet passage. The bolt 18 is inserted into a hollow screw 38 threaded into head 17 and the screw 38 bears against a strong compressed spring 39 and is provided at one end with a lock nut 40. Adjustment of screw 38 varies the tensioning of the spring 39. A cap 40' secures the hollow screw 38 in its position and protects it against damage. In the face of the piston 2 is provided a disc shaped shallow recess 62 into which projects the inner free peripheral end of the tube 36 in such a manner that at the outer end of the piston stroke the liquid which the piston pushes out in front, flows in the direction of the arrows, the annular bounding wall of this recess 62 more or less enclosing in this position the inner tube end, and the distance $a$ between the piston 2 and the edge of the tubular part 36 decreasing gradually whereby damping of the speed of the piston before its outer dead centre position is effected. After the middle portion 41 has come into contact with the bolt 18, only a very small play remains between the parts 2 and 36. For facilitating the return movement of the piston a yielding valve 42 which is pressed by a spring to its seat and is opened towards the interior of the cylinder is provided in the plate 37. Deformation of the spring 39 is only inconsiderable and immediately disappears. The provision of the spring has, however, the effect of reducing audibility of the noise caused by the impact.

The construction according to Fig. 6 may be further varied according to Fig. 7 for a certain purpose, namely, in such a manner that a small piston pump is connected or substituted for the hydraulic shock damping device. The device provided for this purpose contains a small piston pump, the piston 18' of which replaces the abutment bolt 18 of Figs. 1 and 6. The piston 18' which operates in cylinder 43 fixed and suitably packed, as shown, in head 17 is pressed by a spring 44 into its outer position and is limited in the latter by a screwed on nut 45. The liquid enters the cylinder of this pump during the intake stroke of piston 2 through ports 46 which are afterward temporarily covered by piston 18'. The liquid in cylinder 43 is pressed by way of the non-return valve 47 which is loaded by a sufficiently strong spring 48, and flows through the opening in the nut 49 and through a pipe 51, which is connected to the outer end of the guide cylinder 43 by means of a cap-shaped nut 50. The flow passage opening 61 of the non-return valve 47 can be made so small that this piston pump will also act as a shock damping device and simultaneously forces out a quantity of fluid pretermined by the dimensions of the plunger 18', which has not been measured or metered and which serves as an average sample for ascertaining the condition of the quantity of fluid which has passed through the meter.

It is obvious that each pair of working pistons of the meter may have under the influence of differently set screws a different stroke. In order to obtain an independent movement of the two yokes 3, 3', the crank member is preferably constructed in accordance with Figs. 8 and 9 which supplement Fig. 1. Two pistons 2 (in Fig. 9 only one piston is shown) are always connected by a yoke 3 or 3' formed with a yoke portion 4a or 4a'; respectively. In these slots move with a slight play rollers 4, 4' mounted upon a pin 5, said pin being inserted into the crank arm 8, which latter is arranged rotatable about a bolt 52 and adjustable relative to the second crank arm 8' also on said bolt 52. This second crank arm 8' is arranged rotatable about the pin 6 the axis of which preferably coincides with the axis of the whole meter. The pin 52 formed as a bolt permits free pivotal movement between arms 8 and 8' so that the length of the stroke of one set of pistons may be different than the stroke of the other set of pistons. By this arrangement a variable radius of the path described by the axis of the rollers 4, 4' is attained. The radius varies in the course of each quarter revolution and its run is periodical. With this construction independence of the movement of one yoke of that of the other is possible within wide limits, and moreover, the shocks occurring with other constructions in which the rollers are fixed upon an arm of non-varying radius and a considerable play occurs between the rollers and the cross slides, are avoided. All described arrangements and initial parts constituting a whole aim at the same object of obtaining a constantly maintained accuracy of measurement and the elimination of mechanical and hydraulic shocks in multi-piston meters.

What we claim is:—

1. A multi-piston meter comprising a rotary distributing valve and crank mechanism for driving said valve, a casing for said valve, said valve having the shape of a body of rotation with two parallel seating surfaces disposed perpendicular to the axis of rotation, said valve having inlet and outlet openings in the lower seating surface thereof, said inlet opening being connected by a channel with an opening in the side wall of said valve and said outlet opening being connected by another channel with an opening in the upper seating surface of said valve, said valve being characterized by the feature that the outer diameter $d$ of the upper seating surface bears a relation to the outer diameter $D$ of the lower seating surface according to the equation $$d = 1.25\sqrt{\frac{3}{10}D^2}$$

2. A multi-piston meter comprising a rotary distributing valve and crank mechanism for driving said valve, a casing for said valve, said valve having the shape of a body of rotation with two parallel seating surfaces disposed perpendicular to the axis of rotation, said valve having inlet and outlet openings in the lower seating surface thereof, said inlet opening being connected by a channel with an opening in the side wall of said valve and said outlet opening being connected by another channel with an opening in the upper seating surface of said valve, said valve being characterized by the feature that the outer diameter $d$ of the upper seating surface bears a relation to the outer diameter $D$ of the lower seating surface according to the equation $$d = 1.25\sqrt{\frac{3}{10}D^2}$$

the body of the valve being divided into two parts perpendicularly to the axis, and means for pressing said valve parts away from each other in sealing and axially resilient relation and for rigidly connecting said valve parts to prevent twisting and torsional movement.

3. In multi-piston meters, a rotatable distributor valve, said distributor valve having the shape of a hollow truncated cone, the hollow base of said cone having an inlet port and an outlet port, said inlet port being connected to an opening in the wall of said cone and said outlet port being connected to an opening in the top of said cone, an elastically connected cylindrical member connected to the top of said cone for connecting said outlet port to a fluid carrying duct, a casing connected to the bottom of said rotatable distributor valve, four metering cylinders in said casing having pistons therein, a hydraulic and mechanical shock damping means positioned in said casing in alignment with said metering cylinders, said pistons and cylinders being arranged in pairs, connecting means for connecting said pistons in pairs, crank means for engaging said piston connecting means, and means for operating said distributor valve in accordance with the angular movement of said crank means, said crank means being substantially coaxial with said distributor valve and means for completely separating the crank chamber from the liquid chambers of said distributor valve and the ducts connected thereto.

4. In multi-piston meters, a rotatable distributor valve, a crank mechanism for driving said valve, said distributor valve having the shape of a hollow truncated cone, the hollow base of said cone having an inlet port and an outlet port, said inlet port being connected to an opening in the wall of said cone and said outlet port being connected to an opening in the top of said cone, a cylindrical member slidably connected to the top of said cone for connecting said outlet port to a fluid carrying duct, a casing connected to the bottom of said rotatable distributor valve, a plurality of metering cylinders in said casing, a piston for each of said cylinders, means for connecting each of said pistons to said crank mechanism, a hydraulic and mechanical shock damping means positioned in said casing for limiting the stroke of each of said pistons and means for adjusting said shock damping means for reducing the noise of the impact of said pistons thereon.

5. In multi-piston meters, a rotatable distributor valve, a crank mechanism for driving said valve, said distributor valve having the shape of a hollow truncated cone, the hollow base of said cone having an inlet port and an outlet port, said inlet port being connected to an opening in the wall of said cone and said outlet port being connected to an opening in the top of said cone, a cylindrical member slidably connected to the top of said cone for connecting said outlet port to a fluid carrying duct, a casing connected to the bottom of said rotatable distributor valve, four metering cylinders in said casing, a piston for each of said cylinders, a hydraulic and mechanical shock damping means positioned in said casing for limiting the stroke of each of said pistons, said pistons and cylinders being arranged in pairs, connecting means for connecting said pistons in pairs, said crank mechanism including crank means for engaging said piston connecting means and means for operating said distributor valve in accordance with the angular movement of said crank means, said crank means being substantially coaxial with said distributor valve.

6. In multi-piston meters, a rotatable distributor valve, a crank mechanism for driving said valve, said distributor valve having the shape of a hollow truncated cone, the hollow base of said cone having an inlet port and an outlet port, said inlet port being connected to an opening in the wall of said cone and said outlet port being connected to an opening in the top of said cone, a cylindrical member slidably connected to the top of said cone for connecting said outlet port to a fluid carrying duct, a casing connected to the bottom of said rotatable distributor valve, four metering cylinders in said casing, a piston for each of four cylinders, a hydraulic and mechanical shock damping means for each of said pistons, said pistons and cylinders being arranged in pairs, connecting means for connecting said pistons in pairs, said crank mechanism including crank means for engaging said piston connecting means and means for operating said distributor valve in accordance with the angular movement of said crank means, said crank means being substantially coaxial with said distributor valve and means for completely separating the crank chamber from the liquid chambers of said distributor valve and the ducts connected thereto.

7. In multi-piston meters, as set forth in claim 1, a casing connected to the bottom of said valve casing, a plurality of cylinders in said last casing, pistons for said cylinders, said pistons being connected to said crank mechanism, hydraulic and mechanical shock damping means positioned in said last casing in alignment with each of said metering cylinders for limiting the movement of said pistons and means for adjusting said shock damping means.

8. In multi-piston meters, as set forth in claim 1, a casing connected to the bottom of said valve casing, a plurality of cylinders in said last casing, pistons for said cylinders, said pistons being connected to said crank mechanism, hydraulic and mechanical shock damping means positioned in said last casing in alignment with said metering cylinders, said shock damping means each having a piston for abutting said metering cylinder pistons, and a small cylinder for receiving each of said shock damping means pistons.

FRANTIŠEK HEJDUK.
JAN NEUMANN.